United States Patent [19]

Yamashita et al.

[11] Patent Number: 5,371,168

[45] Date of Patent: Dec. 6, 1994

[54] AMORPHOUS POLYIMIDE POWDER, PREPARATION PROCESS OF THE POWDER, AND HEAT-RESISTANT ADHESIVE AND BONDING METHOD BY USE OF THE POWDER

[75] Inventors: Wataru Yamashita; Shoji Tamai; Akihiro Yamaguchi, all of Kanagawa, Japan

[73] Assignee: Mitsui Toatsu Chemicals, Inc., Tokyo, Japan

[21] Appl. No.: 894,422

[22] Filed: Jun. 5, 1992

[30] Foreign Application Priority Data

Jun. 17, 1991 [JP] Japan .................. 3-144402

[51] Int. Cl.⁵ .................. C08G 8/02; C08G 69/26; C08G 73/10
[52] U.S. Cl. .................. 528/125; 528/126; 528/128; 528/172; 528/173; 528/176; 528/183; 528/188; 528/220; 528/229; 528/350; 528/351; 528/353; 526/935
[58] Field of Search .............. 528/353, 350, 351, 126, 528/125, 128, 178, 172, 176, 183, 188, 220, 229; 526/935

[56] References Cited

U.S. PATENT DOCUMENTS

| | | | |
|---|---|---|---|
| 4,065,345 | 12/1977 | Progar et al. | 528/353 |
| 4,094,862 | 6/1978 | Bell | 528/352 |
| 4,389,504 | 6/1983 | St. Clair et al. | 524/233 |
| 4,394,467 | 7/1983 | Edelman | 524/600 |
| 4,543,295 | 9/1985 | St. Clair et al. | 428/473.5 |
| 4,595,548 | 6/1986 | St. Clair et al. | 528/183 |
| 4,699,841 | 10/1987 | Kundinger et al. | 528/351 |
| 4,705,720 | 11/1987 | Kundinger et al. | 528/351 |
| 4,808,731 | 2/1989 | Berdahl et al. | 549/241 |
| 4,937,317 | 6/1990 | Pratt et al. | 528/353 |
| 5,041,520 | 8/1991 | Ohta et al. | 528/353 |
| 5,147,966 | 9/1992 | St. Clair et al. | 528/353 |

FOREIGN PATENT DOCUMENTS 179604 4/1986 European Pat. Off. .
350203 1/1990 European Pat. Off. .
384712 8/1990 European Pat. Off. .
2-18419 1/1990 Japan .

*Primary Examiner*—John Kight, III
*Assistant Examiner*—P. Hampton-Hightower
*Attorney, Agent, or Firm*—Burns, Doane, Swecker & Mathis

[57] ABSTRACT

Amorphous polyimide powder which has recurring structural units of the formula (I):

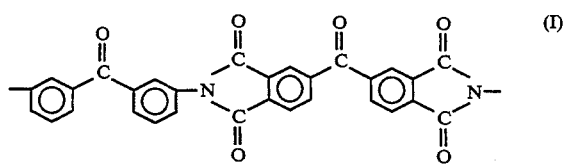

as a fundamental skeleton, is blocked at the polymer chain end with dicarboxylic anhydride represented by the formula (II)

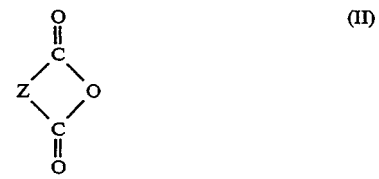

wherein Z is a divalent radical having from 6 to 27 carbon atoms and selected from the group consisting of a monoaromatic radical, condensed polyaromatic radical and noncondensed aromatic radical connected to each other with a direct bond or a bridge member, and essentially has no reactive radical at the polymer chain end, preparation process of the amorphous polyimide powder, heat-resistant adhesive comprising the polyimide, and bonding method using the adhesive.

9 Claims, 3 Drawing Sheets

AMORPHOUS POLYIMIDE POWDER, PREPARATION PROCESS OF THE POWDER, AND HEAT-RESISTANT ADHESIVE AND BONDING METHOD BY USE OF THE POWDER

BACKGROUND OF THE INVENTION

1. Field of the Invention

The present invention relates to an amorphous polyimide, and more particularly relates to amorphous polyimide powder having good heat stability and processability, and more particularly, to relates a process for preparing the powder, and a heat resistant adhesive and bonding method by use of the powder.

2. Related Art of the Invention

Conventionally, polyimide prepared by reaction of tetracarboxylic acid dianhydride with diamine is excellent in mechanical strengths and dimensional stability in addition to high heat-resistance and also has flame retardance and electrical insulation properties. Consequently, polyimide has been used in the fields such as electric and electronic devices, space and aeronautic equipment and transport machinery, and is expected for wide use in the fields where heat-resistance is required.

Various kinds of polyimide which exhibit excellent properties have conventionally been developed. In particular, polyimide having recurring structural units of the formula (I):

has been disclosed by Proger et al. in U.S. Pat. No. 4,065,345 and known to have excellent mechanical, thermal and electrical properties and resistance to solvent and heat and also to exhibit melt flowability. The polyimide, however, has been difficult to process such as by injection molding and extrusion because of high melt viscosity as compared with other common engineering plastics which can be injection molded or extruded.

The present inventors have investigated in order to solve these problems, blocked the reactive terminal of a polymer which essentially has the fundamental structure of the above formula (I) to control the molecular weight of the polymer, and thus developed an injection- and extrusion processable polyimide as disclosed in Japanese Laid-Open Patent Hei 2-018419. The polyimide, however, has a melting point of about 360° C. as reported by Ohta et al. in 3th International SAMPE Symposium, Apr. 2-5, P1030(1990) and thus has a disadvantage that the polyimide must be noncrystallized in order to process or bond the polyimide.

The polyimide of the above formula (I) can be utilized for adhesive having excellent heat resistance and primarily used for bonding metals, prepreg, ceramics and polyimide films for FPC substrate, and is expected for wide use as an adhesive by utilizing the thermoplastic property.

Conventionally, adhesion has been carried out by the following methods.

(1) Varnish of polyamic acid precursor is applied to an adhesive surface, pressed and heated to carry out adhesion by solvent removal and imidization.

(2) A polyimide film is inserted into adhesive surfaces and adhesion is carried out by heating under pressure.

(3) Polyimide powder is suspended in a volatile solvent such as alcohol, applied to an adhesive surface, followed by evaporating the solvent and then adhesion is carried out by heating under pressure.

Many other investigations have been carried out to suspend polyimide powder in a solvent, prepare prepreg by impregnating carbon cloth with the resulting suspension, prepare a composite by using the prepreg and to use the composite as a structural material.

In the adhesion using the conventional crystalline polyimide powder of the above formula (I), adhesion cannot be carried out unless the temperature exceeds the melting point of the polyimide.

SUMMARY OF THE INVENTION

An object of the invention is to provide amorphous polyimide powder having recurring structural units of the above formula (I).

Another object of the invention is to provide noncrystalline polyimide powder which has essentially the excellent heat-resistance of the polyimide having the above formula (I) and additionally can be processed at decreased temperature such as its melting point or less.

A further object of the invention is to provide a heat-resistant adhesive and adhesion method which can conduct adhesion at a temperature lower than that of conventional polyimide adhesive, that is, 300° C. or less, in addition to have essentially excellent heat-resistance of the polyimide having the above formula (I).

The present inventors have carried out an intensive investigation on the method for performing processing and adhesion at a further decreased temperature while maintaining the high heat-resistance of the polyimide essentially having the fundamental structure of the formula (I). As a result, they have found that noncrystalline polyimide blocked at the polymer chain end with dicarboxylic anhydride is excellent in processability at decreased temperatures and also exhibits excellent adhesion at decreased temperature. Thus, the present invention has been completed.

That is, one aspect of the present invention is a favorably processable and amorphous polyimide powder which has recurring structural units of the formula (I):

as a fundamental skeleton, is blocked at the polymer chain end with dicarboxylic anhydride represented by the formula (II):

wherein Z is a divalent radical having from 6 to 27 carbon atoms and selected from the group consisting of a monoaromatic radical, condensed polyaromatic radical and noncondensed aromatic radical connected each other with a direct bond or a bridge member, and essentially has no reactive radical at the polymer chain end.

Another aspect of the invention is a process for preparing the polyimide powder by mixing 3,3'-diaminobenzophenone having the formula (III):

with 3,3',4,4'-benzophenonetetracarboxylic dianhydride having the formula (IV):

and dicarboxylic anhydride represented by the formula (II):

wherein Z is a divalent radical having from 6 to 27 carbon atoms and selected from the group consisting of a monoaromatic radical, condensed polyaromatic radical and noncondensed aromatic radical connected to each other with a direct bond or a bridge member, in the presence of an organic base in an organic solvent, reacting at temperature of from 100° to 400° C. and pouring the polymer obtained into a lean solvent which can uniformly mix with the organic solvent used for the reaction.

The mole ratio of the raw materials used is in the range of from 0.8 to 1.0 mole of 3,3',4,4'-benzophenone tetracarboxylic dianhydride having the formula (IV) and from 0.001 to 1.0 mole of dicarboxylic anhydride represented by the formula (II) per mole of 3,3'-diaminobenzophenone having the formula (IV). Particularly preferred organic solvent is phenolic solvent. The amount of the organic base is preferably from 10 to 1000% by mole of the tetracarboxylic dianhydride. The amount of the lean solvent is preferably from 0.5 to 100 times the weight of the organic solvent, that is, the polymerization solvent.

The polyimide powder obtained by the invention is excellent in melt-flow stability at decreased temperatures as compared with conventionally known polyimide and has remarkably improved processability. Further, the polyimide can exhibit satisfactory adhesive strength by bonding at relatively decreased temperatures and can be used for processing or as an adhesive.

BRIEF DESCRIPTION OF THE DRAWINGS

In FIGS. 2, 4 and 5, the abscissa and ordinate are the same as above. The abscissa indicates the value of twice the angle α formed by the incident beam and reflected beam, that is, the scattering angle 2α in the X-ray irradiation. The ordinate indicates the number of absorption of X-ray per second that is, COUNT/SEC (sec).

DETAILED DESCRIPTION OF THE INVENTION

The polyimide powder of the invention essentially has recurring structural units of the formula (I):

as a fundamental skeleton, is blocked at the polymer chain end with dicarboxylic anhydride represented by the formula (II):

wherein Z is the same as above, and is precipitated in the form of amorphous powder by pouring the reaction mixture into a lean solvent.

The noncrystalline polyimide powder of the invention can be prepared by mixing 3,3'-diaminobenzophenone of the above formula (III) with 3,3',4,4'-benzophenonetetracarboxylic dianhydride of the formula (IV) and dicarboxylic anhydride of the formula (II) in an organic solvent in the presence of an organic base, reacting at temperature of from 100° to 300° C., and successively pouring the reaction mixture into a lean solvent which uniformly mixes with the solvent used for the reaction.

The process for preparing the amorphous polyimide powder of the invention will be illustrated hereinafter.

In the process of the invention, 3,3'-diaminobenzophenone is used as the raw material diamine compound. However, other diamine compounds can be used be used as a mixture in an amount giving no adverse effect on the good properties of the polyimide.

Exemplary diamines which can be used in combination include, for example, 4,4'-diaminobenzophenone, 3,4'-diaminobenzophenone, m-phenylenediamine, o-phenylenediamine, p-phenylenediamine,
m-aminobenzylamine,
p-aminobenzylamine,
bis(3-aminophenyl) sulfide,
(3-aminophenyl)(4-aminophenyl) sulfide,
bis(4-aminophenyl) sulfide,
bis(3-aminophenyl) sulfoxide,
(3-aminophenyl)(4-aminophenyl) sulfoxide,
bis(4-aminophenyl) sulfoxide,
bis(3-aminophenyl) sulfone,
(3-aminophenyl)(4-aminophenyl) sulfone,
bis(4-aminophenyl) sulfone,
3,3'-diaminodiphenyl ether,
3,4'-diaminodiphenyl ether,
4,4'-diaminodiphenyl ether,
3,3'-diaminodiphenylmethane,
3,4'-diaminodiphenylmethane,
4,4'-diaminodiphenylmethane,
bis [4-(3-aminophenoxy)phenyl] methane,
bis [4-(3-aminophenoxy)phenyl] methane,
1,1-bis [4-(3-aminophenoxy)phenyl] ethane,
1,1-bis [4-(4-aminophenoxy)phenyl] ethane,
1,2-bis [4-(3-aminophenoxy)phenyl] ethane,
1,2-bis [4-(4-aminophenoxy)phenyl] ethane,
2,2-bis [4-(3-aminophenoxy)phenyl] propane,
2,2-bis [4-(4-aminophenoxy)phenyl] propane,
2,2-bis [4-(3-aminophenoxy)phenyl] butane,
2,2-bis [3-(3-aminophenoxy)phenyl] -1,1,1,3,3,3-hexafluoropropane,
2,2-bis [4-(4-aminophenoxy)phenyl] -1,1,1,3,3,3-hexafluoropropane,
1,3-bis(3-aminophenoxy)benzene,
1,3-bis(4-aminophenoxy)benzene,
1,4-bis(3-aminophenoxy)benzene,
1,4-bis(4-aminophenoxy)benzene,
4,4'-bis(3-aminophenoxy)biphenyl,
4,4'-bis(4-aminophenoxy)biphenyl,
bis [4-(3-aminophenoxy)phenyl] ketone,
bis [4-(4-aminophenoxy)phenyl] ketone,
bis [4-(3-aminophenoxy)phenyl] sulfide,
bis [4-(4-aminophenoxy)phenyl] sulfide,
bis [4-(3-aminophenoxy)phenyl] sulfide,
bis [4-(4-aminophenoxy)phenyl] sulfoxide,
bis [4-(3-aminophenoxy)phenyl] sulfone,
bis [4-(4-aminophenoxy)phenyl] sulfone,
bis [4-(3-aminophenoxy)phenyl] ether,
bis 4-(4-aminophenoxy)phenyl] ether,
1,4-bis [4-(3-aminophenoxy)benzoyl] benzene,
1,3-bis [4-(3-aminophenoxy)benzoyl] benzene,
4,4'-bis [3-(3-aminophenoxy)benzoyl] diphenyl ether,
4,4'-bis [4-(4-amino-α,α-dimethylbenzyl)phenoxy] benzophenone,
4,4'-bis [4-(4-amino-α,α-dimethylbenzyl)phenoxy] diphenyl sulfone,
bis 4- {4-(3-aminophenoxy)phenoxy} phenyl] sulfone,
bis [4- {4-(4-aminophenoxy)phenoxy} phenyl] sulfone,
1,4-bis [4-(4-aminophenoxy)-α,α-dimethylbenzyl] benzene and 1,3-bis [4-(4-aminophenoxy)-α,α-dimethylbenzyl] benzene. These aromatic diamines can be used singly or as a mixture.

3,3',4,4'-Benzophenonetetracarboxylic dianhydride of the formula (IV) is used as another raw material, tetracarboxylic acid anhydride.

In the process of the invention, the tetracarboxylic acid dianhydride is used in an amount of from 0.8 to 1.0 mole per mole of the diamine compound, and preferably from 0.90 to 0.99 mole in view of excellent balance between heat oxidation stability and processability of the resulting polyimide.

In the dicarboxylic anhydride represented by the formula (II) which can be used in the invention, Z in the formula () has from 6 to 27 carbon atoms and is a monoaromatic radical having the formula:

condensed polyaromatic radical having the formula:

or a noncondensed aromatic radical which is connected to each other with a direct bond or a bridge member and is represented by the formula:

wherein $X_1$ is a direct bond, —CO—, —O—, —S—, —SO$_2$—, —CH$_2$—, —C(CH$_3$)$_2$—, —C(CF$_3$)$_2$—, wherein Y is a direct bond, —CO—, —O—, —S—, —SO$_2$—, —CH$_2$—, —C(CH$_3$)$_2$— or —C(CF$_3$)$_2$—.

The aromatic dicarboxylic anhydrides which can be used in the process include, for example, phthalic anhydride,
2,3-benzophenonedicarboxylic anhydride,
3,4-benzophenonedicarboxylic anhydride,
2,3-dicarboxyphenyl phenyl ether anhydride,
3,4-dicarboxyphenyl phenyl ether anhydride,
2,3-biphenyldicarboxylic anhydride,
3,4-biphenyldicarboxylic anhydride,
2,3-dicarboxyphenyl phenyl sulfone anhydride,
3,4-dicarboxyphenyl phenyl sulfone anhydride,
2,3-dicarboxyphenyl phenyl sulfide anhydride,
3,4-dicarboxyphenyl phenyl sulfide anhydride,
1,2-naphthalenedicarboxylic anhydride,
2,3-naphthalenedicarboxylic anhydride,
1,8-naphthalenedicarboxylic anhydride,
1,2-anthracenedicarboxylic anhydride,
2,3-anthracenedicarboxylic anhydride and 1,9-anthracenedicarboxylic anhydride. These dicarboxylic acid anhydrides can be used singly or as a mixture.

The amount of the dicarboxylic anhydride used in the process of the invention is in the range of from 0.001 to 1.0 mole per mole of 3,3'-diaminobenzophenone of the formula (III). When the amount is less than 0.001 mole, melt viscosity is increased in high temperature processing and results in deteriorated processability. On the other hand, an amount exceeding 0.1 mole lowers the mechanical strength of processed articles. Thus, the preferred amount is in the range of from 0.01 to 0.5 mole.

Known processes for polymerizing polyimide can be applied to the invention. Common organic solvents can be used for the reaction.

Useful solvents include, for example, N,N-diethylformamide,
N,N-dimethylacetamide, N,N-diethylacetamide,
N,N-dimethylmethoxyacetamide, N-methyl-2-pyrrolidone,
1,3-dimethyl-2-imidazolidinone, N-methylcaprolactam,
1,2-dimethoxyethane-bis(2-methoxyethyl) ether,
1,3-dioxane, 1,4-dioxane, pyridine, α-picoline, β-picoline, γ-picoline, dimethyl sulfoxide, dimethyl sulfone, tetramethyl urea, hexaphosphorotriamide, diphenyl sulfone, diphenyl ether, benzene, toluene, xylene, anisole and triethylamine.

The reaction can be preferably carried out in phenolic solvent in particular. The phenolic solvents which can be preferably used include, for example, phenol, o-cresol, m-cresol, p-cresol, o-chlorophenol, p-chlorophenol, m-chlorophenol, 2,3-xylenol, 2,4-xylenol, 2,5-xylenol, 2,6-xylenol and 3,4-xylenol. These organic solvents can be used singly or as a mixture.

Solvent is used in an amount of from 1 to 50 times, preferably from 2 to 10 times the total amount of raw materials used for preparing the polyimide. When the amount of the solvent is less than the total amount of the raw materials, stirring of the reaction mixture is difficult and the reaction cannot be sufficiently progressed. On the other hand, an amount of the solvent exceeding 50 times makes the reaction mixture dilute and requires a long reaction time for completing the reaction.

Any organic bases which are effective for polymerization of polyimide can be used in the process of the invention.

Useful organic bases include, for example, pyridine, α-picoline, β-picoline, γ-picoline, trimethylamine and triethylamine. The amount of these organic bases are in the range of from 1 to 1000 % by mole, preferably from 10 to 300% by mole for the amount of the tetracarboxylic dianhydride.

In the process of the invention, 3,3'-diaminobenzophenone, 3,3',4,4'-benzophenonetetracarboxylic dianhydride and dicarboxylic anhydride can be added to react by any one of the following methods.

(A) After reacting 3,3',4,4'-benzophenonetetracarboxylic dianhydride with 3,3'-diaminobenzophenone, dicarboxylic anhydride is added to continue the reaction.

(B) After reacting 3,3'-diaminobenzophenone with dicarboxylic anhydride, 3,3',4,4'-benzophenonetetracarboxylic dianhydride is added to continue the reaction.

(C) 3,3',4,4'-Benzophenonetetracarboxylic dianhydride, 3,3'-diaminobenzophenone and dicarboxylic anhydride are added at the same time and the reaction is carried out.

In the reaction forming the polyamic acid, the reaction temperature is usually 250° C. or less, preferably 50° C. or less. No particular limitation is imposed upon the reaction pressure. The reaction can be satisfactorily carried out under atmospheric pressure. Reaction time differs depending upon kind of the solvent and the reaction temperature. Sufficient reaction time is usually from 0.1 to 24 hours.

The polyamic acid thus obtained is imidized by heating at a temperature of from 100° to 400° C. or chemically imidized by using an imidizing agent such as acetic anhydride to obtain polyimide having recurring units corresponding to the polyamic acid.

Alternatively, 3,3',4,4'-benzophenonetetracarboxylic dianhydride, 3,3'-diaminobenzophenone and dicarboxylic anhydride are suspended or dissolved in the organic solvent and formation and imidization of polyamic acid precursor can be simultaneously carried out to obtain polyimide.

The amorphous polyimide powder of the invention can be obtained by the following procedures from the polyimide prepared by the above process.

When the polyimide is dissolved in the organic solvent used for the reaction, the polyimide-containing reaction mixture is discharged or poured as intact with vigorous stirring into a lean solvent which is used in an amount of from 5 to 100 times the weight of the polymer. When the polyimide is precipitated, it is dissolved by further adding the same or different organic solvent or by warming to the temperature where the precipitate can be maintained in a dissolved state and the resulting solution is poured with vigorous stirring into a lean solvent, the amount of which is from 1 to 100 times the weight of the polymer. When the polyimide is similarly precipitated, the polyimide powder is first isolated from the reaction mixture by known methods and the isolated polyimide is dissolved again in a suitable solvent. The solution thus obtained is poured with vigorous stirring into a lean solvent which is used in an amount of from 1 to 500 times the weight of the polyimide.

If purification is required, the solvent, catalyst and volatile impurities which are present in the reaction mixture are removed by heating and/or under reduced pressure, and the thus-isolated polyimide powder is dissolved again in the same organic solvent as used in the reaction. The solution obtained is poured with vigorous stirring into a lean solvent, the amount of which is from 1 to 100 times the weight of the polyimide.

Alternatively, polyimide powder is prepared by a known process or the process of the invention, the thus-obtained polyimide powder is subjected to extruding, injection molding, sintering or other various kinds of processing, and the amorphous polyimide articles thus formed is crushed to prepare amorphous polyimide powder which can be used without any trouble.

Further, formed polyimide articles prepared by similar processes is dissolved in a suitable organic solvent and the amorphous polyimide powder can also be obtained by pouring the resulting polymer solution with vigorous stirring into a lean solvent which is used in an amount of from 1 to 500 times the weight of the polymer.

The process greatly differs from the conventional preparation process of polyimide and can provide amorphous polyimide powder which is a characteristic of the invention.

Exemplary lean solvents which can be used for the precipitation process include, for example, acetone, methyl ethyl ketone, methanol. ethanol, n-propanol, isopropanol, pentane, hexane, heptane, octane, pentene, cyclohexane, cyclohexanol, 1,3-dioxane, 1,4-dioxane, benzene, toluene, ethylbenzene, o-xylene, m-xylene, p-xylene, anisole, acetophenone, pyridine, α-picoline, β-picoline, γ-picoline, diethyl ether, methyl acetate, acetaldehyde, acetonitrile, acrylonitrile, triethylamine, carbon tetrachloride, dichloromethane, chloroform, 1,1,2-trichloroethane, 1,1,2,2-tetrachloroethane and chlorobenzene. Preferred lean solvents are acetone, methyl ethyl ketone and toluene. These precipitation solvents can be used as a mixture as long as giving no adverse effect on the properties of polyimide obtained.

No particular restriction is placed upon the temperature of the polyimide containing solution or reaction mixture in the discharging or pouring step. Preferred temperatures are from the room temperature to 100° C. in view of workability and stability.

No particular limitation is imposed on the precipitation method and any known method can be used. Noncrystalline polyimide powder which is precipitated in the lean solvent can be separated by a conventional method to obtain the amorphous polyimide powder of the invention.

In the melt processing of the polyimide of the invention, other thermoplastic resins such as polyethylene, polypropylene, polycarbonate, polyarylate, polyamide, polysulfone, polyether sulfone, polyether ketone, polyphenylene sulfide, polyamideimide, polyetherimide, modified polyphenylene oxide and a polyimide except that of the invention can also be blended depending upon the object for use in the range giving no adverse effect on the good properties of the polyimide of the invention.

Various additives used for common resin compositions can be used as long as not impairing the objects of the invention. The additives which can be used include, for example, graphite, carborundum, silica powder, molybdenum disulfide, fluororesin and other abrasion resistance improvers; glass fiber, carbon fiber, boron fiber, silicon carbide fiber, carbon whisker, asbestos, metallic fiber, ceramic fiber and other reinforcements; antimony trioxide, magnesium carbonate, calcium carbonate and other flame retardants; clay, mica and other electrical property improvers; asbestos, silica, graphite and other tracking resistance improvers; barium sulfate, silica, calcium meta-silicate and other acid resistance improvers; iron powder, zinc powder, aluminum powder, copper powder and other thermal conductivity improvers; and other miscellaneous materials such as glass beads, glass balloon, talc, diatomaceous earth, alumina, silicate balloon, hydrated alumina, metal oxides and colorants.

The amorphous polyimide powder of the invention can exhibit excellent adhesive properties as a heat-resistant adhesive at lower temperatures of 300° C. or less in particular.

In utilizing the noncrystalline polyimide powder as a heat-resistant adhesive, a suspension of the polyimide powder in a readily volatile solvent is applied as a thin layer to an adherend surface to be laminated, dried in the air for a prescribed time at temperature of from 100° to 300° C. to remove excess solvent, pressed at 100° to 300° C. under pressure of 1 to 1000 kg/cm² and cured at 100° to 300° C. to obtain firmly bonded adherend.

Alternatively, the amorphous polyimide powder is inserted between surfaces to be bonded, pressed at a temperature of from 100° to 300° C. under pressure of 1 to 100 kg/cm², and cured at temperature of from 100° to 300° C. to obtain firm bonding of adherends.

When the heat-resistant adhesive is applied to the adherends to be laminated, application to one adherend alone and application to both adherends can equally provide good bonding effect.

The surface of the adherend can be chemically or physically pre-treated prior to bonding. The method for pre-treating the adherend surface includes, for example, chemical etching by acid or alkali, corona discharge, ultraviolet irradiation, radiation, sand blasting, heat treatment, plasma treatment, polishing, honing, plating, oxide layer treatment and degreasing.

In applying the heat-resistant adhesive of the invention, other resins can be incorporated in the range giving no adverse effect on the characteristics of the heat-resistant adhesive of the invention. Exemplary other resins which can be incorporated include nylon, polyacetal, polycarbonate, polyphenylene oxide, polyethylene terephthalate, polysulfone, polyether sulfone, polyacetal, polyamideimide, polyetherimide, polyetherether ketone, polyimide except that of the invention, fluororesin, bismaleimide and epoxy resin.

Additives can be added to the heat-resistant adhesive of the invention. Useful additives include, for example, solid lubricants such as molybdenum disulfide, graphite, boron nitride, lead monoxide. and lead powder; reinforcements such as glass fiber, carbon fiber, aromatic polyamide fiber, potassium titanate fiber, and glass beads; and common miscellaneous additives such as antioxidants, heat stabilizers, ultraviolet absorbers, flame retardants, auxiliary flame retardants, antioxidants and colorants. These additives can be used singly or as a mixture.

The present invention will hereinafter be illustrated further in detail by way of examples and comparative examples.

The physical properties in the examples and comparative examples were measured by the following methods.

Tg, Tc, Tm:
Measured with Shimadzu DT-40 Series, DSC-41M.
Melt initiation temperature:
Measured with Shimadzu Koka Type Flow Tester CFT500A at temperature-rise rate of 5° C./min under 100 kg load.
Adhesive strength:
Polyimide powder was suspended in ethanol to form paste. The paste was applied to the surface of two cold rolled steel panels (JIS G-3141, SPCC, SD, Dimensions 1.6×25×100 mm) and bonded with a hot press at 280° C. and 300° C. under pressure of 15 kg/cm². Tensile shear strength of the bonded specimen was measured in accordance with JIS K-6850 (ASTMD-1002).

Example 1

To a reaction vessel equipped with a stirrer, reflux condenser, water separator and a nitrogen inlet tube, 12.72 g (0.06 mole) of 3,3'-diaminobenzophenone, 18.547 g (0.0576 mole) of 3,3',4,4'-benzophenonetetracarboxylic acid dianhydride, 0.7104 g (0.0048 mole) of phthalic anhydride, 0.837 g (0.009 mole) of γ-picoline and 125.1 g of m-cresol were charged and heated to 150° C. with stirring in a nitrogen atmosphere while distilling out about 2 cc of water. The reaction was carried out at 150° C. for 4 hours. After cooling to room temperature, the reaction mixture was discharged into 300 g of methyl ethyl ketone. The precipitate was washed with 300 g of methyl ethyl ketone, dried at 50° C. for 12 hours in air and at 220° C. for 4 hours in a nitrogen atmosphere to obtain 29.16 g (97.8% yield) of polyimide powder.

Figure 1:
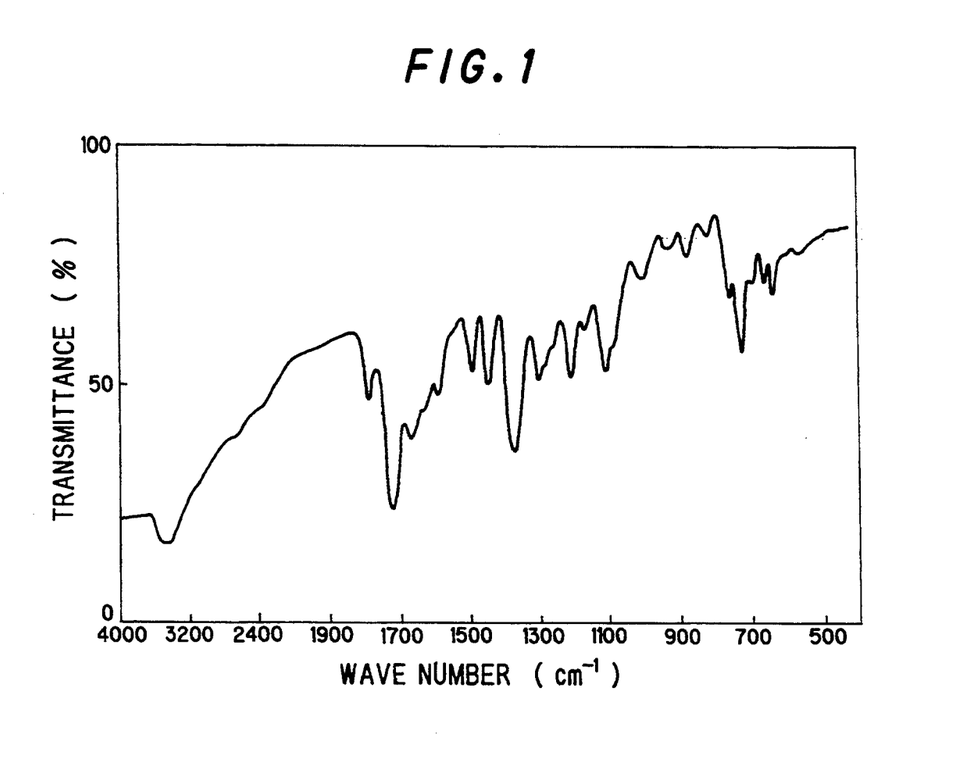
FIG. 1 is a drawing illustrating an IR absorption spectrum of the polyimide powder obtained in Example 1.

The polyimide powder thus-obtained had an inherent viscosity of 0.49 dl/g. The inherent viscosity was measured at 35° C. in a solution containing 0.5 g of the polyimide in 100 ml of a solvent mixture composed of 9 parts by weight of p-chlorophenol and 1 part by weight of phenol. The polyimide powder also had a glass transition temperature of 240° C. and a 5% weight loss temperature of 550° C. in air. An IR absorption spectrum of the polyimide powder is illustrated in FIG. 1. In the spectrum atlas, characteristic absorption bands of imide were distinctly observed in wavelengths of around 1780 cm$^{-1}$ and 1720 cm$^{-1}$.

Following results were obtained in the elemental analysis of the polyimide powder

|  | Elemental analysis | | |
| --- | --- | --- | --- |
|  | C | N | H |
| Calculated (%) | 72.29 | 5.62 | 2.81 |
| Found (%) | 72.20 | 5.67 | 2.85 |

Figure 2:
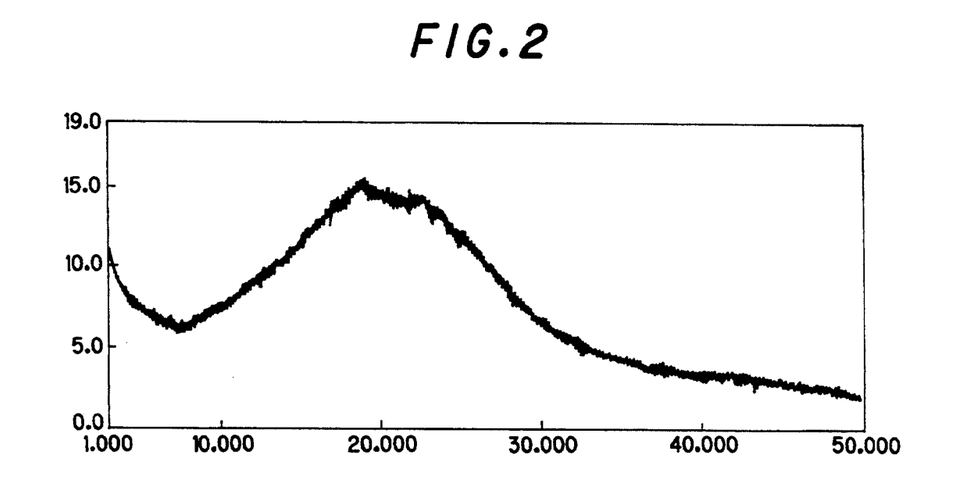
FIG. 2 is a drawing illustrating an X-ray diffraction pattern of the polyimide powder obtained in Example 1.

An X-ray diffraction pattern of the polyimide powder in the example is illustrated in FIG. 2. The diffraction pattern distinctly indicates that the polyimide is an amorphous material.

The polyimide powder had a melt initiation temperature of 320° C. which was measured with a Koka type flow tester under 100 kg load at a temperature increase rate of 5° C./min by using an orifice having a diameter of 0.1 cm and a length of 1 cm.

Figure 3:
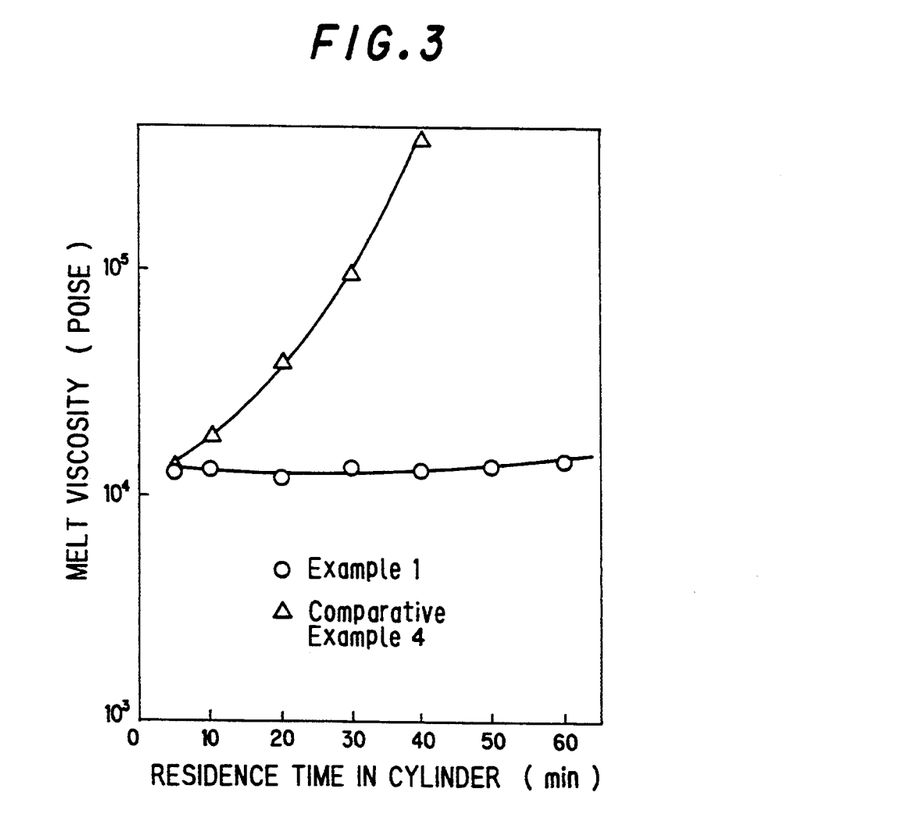
FIG. 3 illustrates melt viscosity of the polyimide powder obtained in Example 4 and Comparative Example 4 when the residence time of the polyimide powder in the cylinder of a flow tester was extended at 350° C. and melt viscosity was measured at 350° C. under 100 kg load in order to compare processing stability of the polyimide powder.

The processing stability of the polyimide powder was measured by changing the residence time in the cylinder of the flow tester at 350° C. under 100 kg load. Results are illustrated in FIG. 3. Melt viscosity was almost constant even though residence was extended. Thus, heat-oxidation stability was good. In the adhesive strength test of the polyimide powder, tensile shear adhesive strength was 278 kg/cm$^2$ at a press temperature of 280° C. and 319 kg/cm$^2$ at 300° C.

Comparative Example 1

To the same reaction vessel as used in Example 1, 12.72 g (0.06 mole) of 3,3'-diaminobenzophenone, 18,547 g (0.0576 mole) of 3,3',4,4'-benzophenonetetracarboxylic dianhydride, 0.7104 g (0.0048 mole) of phthalic anhydride, 0.837 g (0,009 mole) of γ-picoline, and 175.8 g of m-cresol were charged and heated to 150° C. with stirring in a nitrogen atmosphere while distilling out about 2 cc of water. The reaction was further carried out at 150° C. for 4 hours. After cooling the reaction mixture to 110° C., 110° C., 116 g of toluene was added dropwise with stirring and precipitated powder was filtered, washed with 150 g of toluene and dried at 50° C. for 12 hours in the air and at 250° C. for 4 hours in a nitrogen atmosphere to obtain 29.28 g (98.2 % yield) of polyimide powder.

The polyimide powder thus obtained had an inherent viscosity of 0.46 dl/g, a glass transition temperature of 241° C. and 0.5% weight loss temperature of 552° C. in air. In the IR absorption spectrum of the polyimide powder, characteristic absorption bands of imide were distinctly observed at a wavelength of around 1780 cm$^{-1}$ and 1720 cm$^{-1}$.

Figure 4:
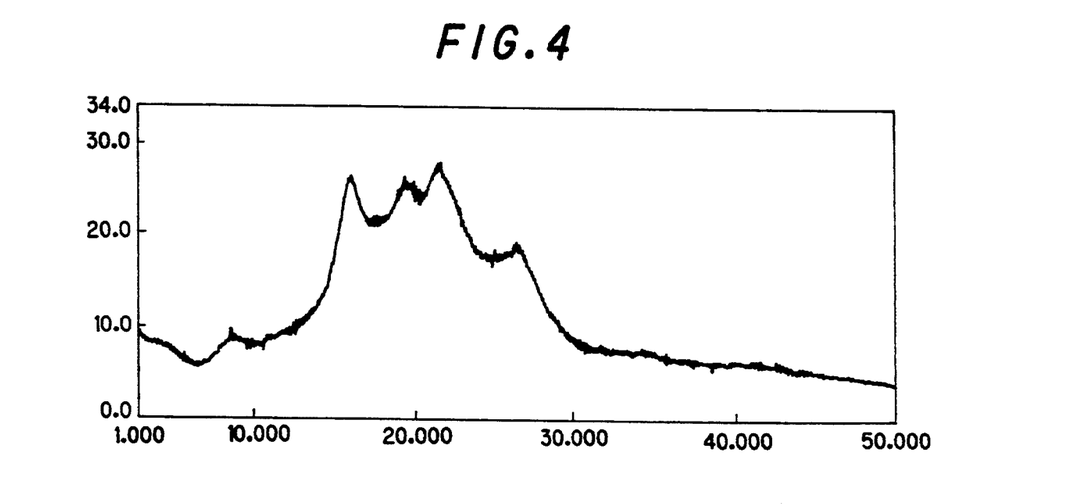
FIG. 4 illustrates an X-ray diffraction pattern of the polyimide obtained in Comparative Example 1.

An X-ray diffraction pattern of the polyimide powder in the comparative example is illustrated in FIG. 4. The diffraction pattern definitely indicates crystalline material.

Further, the polyimide powder had a melt initiation temperature of 325° C. In the adhesive strength test, tensile shear adhesive strength was 0 kg/cm$^2$ at a press temperature of 280° C. and 151 kg/cm$^2$ at 300° C.

Example 2

To the same reaction vessel as used in Example 1, 10 g of the polyimide powder obtained in Comparative Example 1 and 90 g of m-cresol were charged and dissolved by heating to 150° C. After cooling to room temperature, the solution was poured into 200 g of methyl ethyl ketone and filtered to obtain polyimide powder. The polyimide powder thus obtained was washed with 100 g of methyl ethyl ketone and dried at 50° C. for 12 hours in air and at 220° C. for 4 hours in a nitrogen atmosphere.

The resulting polyimide powder had a glass transition temperature of 240° C. and the X-ray diffraction pattern indicated amorphous material. The resulting polyimide powder had a melt initiation temperature of 315° C., and a tensile shear adhesive strength of 268 kg/cm$^2$ at a press temperature of 280° C. and 311 kg/cm$^2$ at 300° C.

Comparative Example 2

To the same reaction vessel as used in Example 1, 12.72 g (0.06 mole) of 3,3'-diaminobenzophenone, 18.547 g (0.0576 mole) of 3,3',4,4'-benzophenonetetracarboxylic dianhydride, 0.7104 g (0.0048 mole) of phthalic anhydride, 5.58 g (0.06 mole) of γ-picoline, and 93.8 g of m-cresol were charged and heated to 150° C. with stirring in a nitrogen atmosphere while distilling out about 2 cc of water. The reaction was further carried out at 150° C. for 4 hours. After cooling the reaction mixture to 110° C., 116 g of toluene was added dropwise with stirring and precipitated powder was filtered, washed with 150 g of toluene and dried at 50° C. for 12 hours in air and at 250° C. for 4 hours in a nitrogen atmosphere to obtain 29.22 g (98.0% yield) of polyimide powder.

The polyimide powder thus obtained had an inherent viscosity of 0.45 dl/g, a glass transition temperature of 240° C. and a 5% weight loss temperature of 555° C. in air. In the IR absorption spectrum of the polyimide powder, characteristic absorption bands of imide were distinctly observed at a wavelength of around 1780 cm$^{-1}$ and 1720 cm$^{-1}$.

An X-ray diffraction pattern of the polyimide powder in the comparative example definitely indicated crystalline material.

Further, the polyimide powder had a melt initiation temDerature of 345° C. In the adhesive strength test, the tensile shear adhesive strength was 0 kg/cm$^2$ at press temperature of 280° C. and 2/kg/cm$^2$ at 300° C.

Example 3

To the same reaction vessel as used in Example 1, 10 g of the polyimide powder obtained in Comparative Example 2 and 90 g of m-cresol were charged and dissolved by heating to 190° C. After cooling to the room temperature, the solution was poured into 200 g of methyl ethyl ketone and filtered to obtain polyimide powder. The polyimide powder thus obtained was washed with 100 g of methyl ethyl ketone and dried at 50° C. for 12 hours in air and at 270° C. for 4 hours in a nitrogen atmosphere.

The resulting polyimide powder had a glass transition temperature of 239° C. and the X-ray diffraction pattern indicated amorphous material. The resulting polyimide powder had a melt initiation temperature of 310° C., and a tensile shear adhesive strength of 262 kg/cm² at a press temperature of 280° C. and 307 kg/cm² at 300° C.

Comparative Example 3

To the same reaction vessel as used in Example 1, 21.2 g (0.1 mole) of 3,3'-diaminobenzophenone and 209.7 g of N-methyl-2-pyrrolidone were charged and 31.23 g (0.097 mole) of 3,3',4,4'-benzophenonetetracarboxylic dianhydride was added by portions in a nitrogen atmosphere with caution to present temperature rise of the solution. Thereafter 2.66 g (0.018 mole) of phthalic anhydride was added and stirred for 24 hours. Further, 40.8 g (0.4 mole) of acetic anhydride and 0.93 g (0.01 mole) of γ-picoline were added dropwise and warmed to 70° C. to precipitate powder. The powder was filtered, washed with 280 ml of methyl ethyl ketone, and dried at 50° C. for 12 hours in air and at 250° C. for 4 hours in a nitrogen atmosphere to obtain 46.9 g (96.0% yield) of polyimide powder.

The polyimide powder thus obtained had an inherent viscosity of 0.46 dl/g, a glass transition temperature of 238° C., and a 5% weight loss temperature of 553° C. in air. In the IR absorption spectrum of the polyimide powder, characteristic absorption bands of imide were distinctly absorbed at a wavelength of around 1780 cm⁻¹ and 1720 cm⁻¹.

Figure 5:
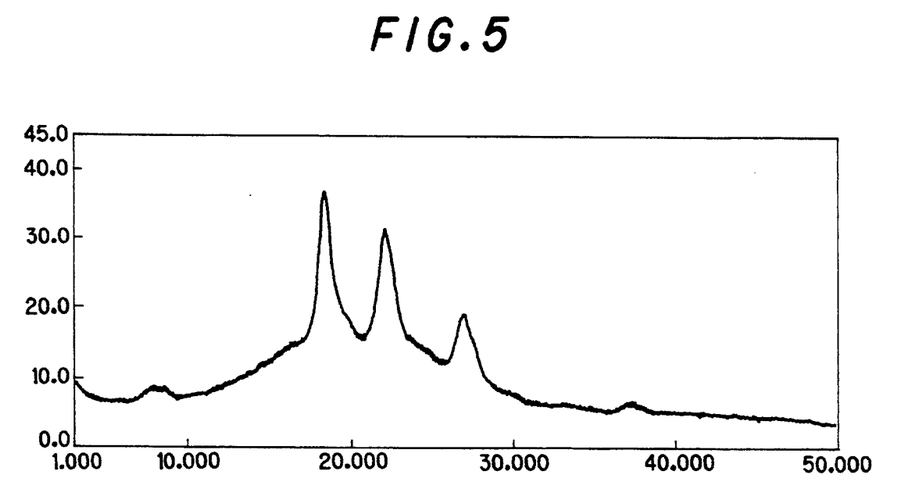
FIG. 5 illustrates an X-ray diffraction pattern of the polyimide obtained in Comparative Example 5.

An X-ray diffraction pattern of the polyimide powder in the comparative example is illustrated in FIG. 5.

Further, the polyimide powder had a melt initiation temperature of 320° C. In the adhesive strength test, tensile shear adhesive strength was 28 kg/cm² at a press temperature of 280° C. and 153 kg/cm² at 300° C.

Example 4

To the same reaction vessel as used in Example 1, 10 g of the polyimide powder obtained in Comparative Example 3 and 90 g of m-cresol were charged and dissolved by heating to 150 C. After cooling to room temperature, the solution was poured into 200 g of methyl ethyl ketone and filtered to obtain polyimide powder. The polyimide powder thus obtained was washed with 100 g methyl ethyl ketone and dried at 50° C. for 12 hours in air and at 220° C. for 4 hours in a nitrogen atmosphere.

The resulting polyimide powder had a glass transition temperature of 240° C. and the X-ray diffraction pattern indicated amorphous material. The resulting polyimide powder had a melt initiation temperature of 315° C., and a tensile shear adhesive strength of 263 kg/cm² at a press temperature of 280° C. and 324 kg/cm² at 300° C.

Comparative Example 4

Polyimide powder was prepared by the same procedures without using phthalic anhydride. The polyimide powder had a glass transition temperature of 241° C. and an inherent viscosity of 0.52 dl/g. Melt viscosity was measured by changing the residence time of the polyimide powder in the cylinder of a flow tester. As illustrated in FIG. 3, melt viscosity was increased with extended residence time. Thus, heat stability of the polyimide powder thus obtained was inferior to the polyimide powder obtained in Example 1.

What is claimed is:

1. A processable and amorphous polyimide powder which has recurring structural units of the formula (I):

as a fundamental skeleton, is blocked at the polymer chain end with dicarboxylic anhydride represented by the formula (II):

wherein Z is a divalent radical having from 6 to 27 carbon atoms and selected from the group consisting of a monoaromatic radical, condensed polyaromatic radical and noncondensed aromatic radical connected each other with a direct bond or a bridge member, and which has a higher tensile shear adhesive strength at a temperature of 300° C. or less compared to the crystalline form of the polyimide powder.

2. A process for preparing the amorphous polyimide powder of claim 1 having recurring structural units of the formula (I) comprising the steps of mixing 3,3'-diaminobenzophenone having the formula (III):

with 3,3',4,4'-benzophenonetetracarboxylic dianhydride having the formula (IV):

and dicarboxylic anhydride represented by the formula (II):

wherein Z is a divalent radical having from 6 to 27 carbon atoms and selected from the group consisting of a monoaromatic radical, condensed polyaromatic radical and noncondensed aromatic radical connected to each other with a direct bond or a bridge member, in the presence of an organic base in an organic solvent, reacting the mixture at temperature of from 100° to 300° C. pouring a solution containing dissolved polyimide prepared by the reaction into a lean solvent which can uniformly mix with said organic solvent and which precipitates the amorphous polyimide and isolating the precipitated amorphous polyimide.

3. A process for preparing an amorphous polyimide powder of claim 1 having recurring structural units of the formula (I) comprising the steps of dissolving the polyimide powder which has recurring structural units of the formula (I):

as a fundamental skeleton, is blocked at the polymer chain end with dicarboxylic anhydride represented by the formula (II):

wherein Z is a divalent radical having from 6 to 27 carbon atoms and selected from the group consisting of a monoaromatic radical, condensed polyaromatic radical and noncondensed aromatic radical connected to each other with a direct bond or a bridge member, in an organic solvent capable of dissolving the polyimide, pouring the resulting solution into a lean solvent which can uniformly mix with said organic solvent and which precipitates the amorphous polyimide and isolating the precipitated amorphous polyimide.

4. A process for preparing the amorphous polyimide powder of claim 2 wherein 1 mole of 3,3'-diaminobenzophenone of the formula (III) is reacted with from 0.8 to 1.0 mole of 3,3',4,4'-benzop henonetetracarboxylic dianhydride of the formula (IV) and from 0.001 to 1.0 mole of dicarboxylic anhydride of the formula (II).

5. The process for preparing the amorphous polyimide powder of claim 2 wherein the organic solvent is a phenolic solvent.

6. The process for preparing the amorphous polyimide powder of claim 2 wherein the amount of the organic base is from 10 to 1000% by mole for the amount of the tetracarboxylic acid dianhydride and the amount of the lean solvent is from 1 to 100 times the weight of the organic solvent.

7. A heat resistant adhesive comprising an amorphous polyimide powder which has recurring structural units of the formula (I):

as a fundamental skeleton, is blocked at the polymer chain end with dicarboxylic acid anhydride represented by the formula (II):

wherein Z is a divalent radical having from 6 to 27 carbon atoms and selected from the group consisting of a monoaromatic radical, condensed polyaromatic radical and noncondensed aromatic radical connected to each other with a direct bond or a bridge member, and which has a higher tensile shear adhesive strength at a temperature of 300° C. or less comparedto the crystalline form of the polyimide powder.

8. The heat-resistant adhesive of claim 7 wherein the amorphous polyimide powder is obtained by mixing 3,3'-diaminobenzophenone with 3,3',4,4'-benzophenonetetracarboxylic dianhydride and dicarboxylic anhydride represented by the formula (II):

wherein Z is a divalent radical having from 6 to 27 carbon atoms and selected from the group consisting of a monoaromatic radical, condensed polyaromatic radical and noncondensed aromatic radical connected to each other with a direct bond or a bridge member, in the presence of an organic base in an organic solvent, reacting the mixture at temperature of from 100° to 300° C. and pouring a solution containing dissolved polyimide prepared by the reaction into a lean solvent which can uniformly mix with said organic solvent and which precipitates the amorphous polyimide and isolating the precipitated amorphous polyimide.

9. The process of preparing the amorphous powder of claim 5 wherein the phenolic solvent is selected from the group consisting of phenol, o-cresol, m-cresol, p-cresol, o-chlorophenol, p-chlorophenol, m-chlorophenol, 2,3-xylenol, 2,4-xylenol, 2,5-xylenol, 2,6-xylenol, 3,4-xylenol and mixtures thereof.

* * * * *